United States Patent [19]
Beard et al.

[11] Patent Number: 5,725,066
[45] Date of Patent: *Mar. 10, 1998

[54] ACTIVE TRACTOR SUSPENSION SYSTEM

[75] Inventors: Andrew M. Beard, Winchester, Mass.; Andreas H. von Flotow, Hood River, Oreg.

[73] Assignee: Applied Power Inc., Butler, Wis.

[*] Notice: The term of this patent shall not extend beyond the expiration date of Pat. No. 5,603,387.

[21] Appl. No.: 781,756

[22] Filed: Jan. 10, 1997

Related U.S. Application Data

[63] Continuation of Ser. No. 525,432, Sep. 6, 1995, Pat. No. 5,603,387.

[51] Int. Cl.[6] .......................... B62D 24/04; B62D 33/10
[52] U.S. Cl. .................... 180/89.12; 280/711; 267/64.24; 296/190
[58] Field of Search .................. 180/89.12, 89.13; 296/190, 35.1; 267/64.24, 64.23, 64.21, 64.19; 280/711, 708

[56] References Cited

U.S. PATENT DOCUMENTS

| | | | |
|---|---|---|---|
| 3,701,499 | 10/1972 | Schubert et al. | 244/17.27 |
| 4,294,324 | 10/1981 | Kimball et al. | 296/190 |
| 4,502,673 | 3/1985 | Clark | 267/64.24 |
| 4,625,993 | 12/1986 | Williams et al. | 280/707 |
| 4,871,189 | 10/1989 | Van Breemen | 180/89.12 |
| 5,015,009 | 5/1991 | Ohyama et al. | 280/772 |
| 5,044,455 | 9/1991 | Tecco et al. | 180/89.13 |
| 5,255,935 | 10/1993 | Imani | 280/708 |
| 5,299,651 | 4/1994 | Wilson | 180/89.12 |
| 5,322,321 | 6/1994 | Yopp | 280/707 |

FOREIGN PATENT DOCUMENTS

| | | | |
|---|---|---|---|
| 0 512 550 A2 | 11/1992 | European Pat. Off. | |
| 43 13 973 A1 | 11/1994 | Germany. | |
| 43 24 289 A1 | 1/1995 | Germany. | |
| 61-193910 | 8/1986 | Japan. | |
| 62018374 | 1/1987 | Japan. | |
| 63-064810 | 3/1988 | Japan. | |
| 6107242 | 4/1994 | Japan. | |
| 2 003 255 | 3/1979 | United Kingdom. | |
| WO89/00512 | 1/1989 | WIPO. | |
| WO91/13776 | 9/1991 | WIPO. | |
| 93/08065 | 4/1993 | WIPO | 296/190 |
| 93/19973 | 10/1993 | WIPO | 296/190 |

*Primary Examiner*—Peter C. English
*Attorney, Agent, or Firm*—Quarles & Brady

[57] ABSTRACT

An active vehicle suspension employs a multi-point support system between a vehicle's chassis and cab. Each support point has an isolator which includes a linear hydraulic actuator that is connected at its quiet end to the payload by a passive vibration isolator and is connected at its vibrating end to the chassis. Each isolator also has a support spring to off-load the majority of the weight of the cab from the hydraulic actuator. An accelerometer is mounted to sense movement at a point between the linear hydraulic actuator and the passive vibration isolator. An electrical signal produce by the accelerometer is processed to operate a hydraulic valve that controls movements of the hydraulic actuator so that transmission of vibrations from the chassis to the cab is attenuated.

13 Claims, 3 Drawing Sheets

ACTIVE TRACTOR SUSPENSION SYSTEM

This is a continuation of U.S. Patent application Ser. No. 08/525,432 filed on Sep. 6, 1995 now U.S. Pat. No. 5,603,387.

BACKGROUND OF THE INVENTION

1. Field of the Invention

This invention relates to suspension systems for supporting a structure on a body, such as supporting the body of a vehicle on a chassis; and more particularly to active vibration isolation suspension systems.

2. Discussion of the Prior Art

Vibration has an adverse affect on the productivity of work vehicles of the type in which an operator cab is supported on a chassis. Such vehicles include agricultural tractors and over the road truck tractors. The vibrations experienced by such vehicles reduce their reliability, increase mechanical fatigue of components, and most importantly increase human fatigue due to acoustic pressure and violent motion of the body.

Therefore, it is desirable to minimize vibration of the vehicle cab in which the operator sits. Through reduction of low frequency vibrations experienced by the cab, driver fatigue and vehicle operability are improved, while reducing higher vibration frequencies decreases human and mechanical fatigue, as well as rattle induced malfunctions.

Previous vehicle cab suspension systems typically performed poorly in the frequency range where the human body is most sensitive, i.e. one to ten hertz. When subjected to vertical movement, or bounce, the human abdomen resonates at approximately four to eight hertz and the head and eyes resonate at ten hertz. The upper torso resonates in response to pitch and roll movement at between one and two hertz. As a consequence, a vehicle suspension system needs high performance at these frequencies and directions to be effective in counteracting vibration.

Very soft cab mounts can provide good attenuation in all directions in this low frequency range (one to ten hertz), but have very poor force rejection ability. In other words, a relatively small external force on the vehicle cab makes it deflect unacceptably. Other cab suspension systems, which are relatively stiff and thus have good force rejection, tend to provide poor low frequency isolation. In many instances, such systems actually amplify the frequencies to which the human body is most sensitive.

It is more desirable to have a suspension system which is hard relative to external forces acting on the cab, but soft to disturbances transferred from the chassis up to the cab, in other words, a hard/soft system. With such a system, the cab feels rigid when the operator climbs into the tractor, but the offending vibrations which would otherwise be transmitted from the chassis to the cab never reach the operator.

A conventional passive suspension system 5 for a vehicle is shown in FIG. 1 and consists of a spring 6 and a damper 7, such as a conventional shock absorber, connected in parallel between the chassis 8 and the body 9 of the vehicle. The motion of the body is defined by the expressions:

$$\dot{P} = K\delta + R(V_I - V_o)$$

$$\dot{\delta} = V_I - V_o$$

where M is the mass of the body, K is the stiffness spring 6, R is the damping coefficient R of the shock absorber, $V_o$ is the velocity of the body mass and $V_I$ is the inertial velocity of the chassis disturbance. The transmissibility of the suspension is given by:

$$\frac{V_0}{V_I} = \frac{\frac{R}{M}S + \frac{K}{M}}{S^2 + \frac{R}{M}S + \frac{K}{M}}$$

where s is the Laplace variable.

A trade-off exists in the design of this simple spring and damper suspension system. In order to isolate vibrations at relatively high frequencies, it is desirable to reduce the damping coefficient R. However, such a system tends to resonate, as an automobile with badly worn and ineffective shock absorbers, thereby producing a very springy ride. Increasing the damping coefficient to overcome the springy ride problem decreases the isolation of high frequency vibrations.

A previous attempt to avoid this trade-off, provided a system which dynamically altered the damping force in response to the sensed movement of the mass being isolated. In that system the force Fc exerted by the damper varied in proportion to the mass velocity. Thus the damping coefficient changed in response to the particular disturbance affecting the mass. The motion of the mass in that system is defined by the expressions:

$$\dot{P} = K\delta + R - V_o$$

$$\dot{\delta} = V_I - V_o$$

Thus the dependence on the motion of the chassis has been removed. The transmissibility of the suspension is given by:

$$\frac{V_0}{V_I} = \frac{\frac{K}{M}}{S^2 + \frac{R}{M}S + \frac{K}{M}}$$

As evident from the transmissibility the feedback from the sensed mass motion affects only the damping term in the denominator.

SUMMARY OF THE INVENTION

The present suspension system provides good broad-band vibration attenuation, starting at below one hertz and extending into the thousands of hertz, not only for bounce, but for pitch and roll movement as well. The present inventive concept reduces the overall RMS accelerations experienced by the operator of the vehicle. Low frequency disturbances to which the human body is most sensitive are attenuated, along with the higher frequencies which cause acoustic disturbance. The invention provides this performance advantage with minimal impact on the overall structure of the vehicle and at a cost that provides value.

The present invention provides such a suspension system using stiff active actuators which are controlled in response to a sensed chassis disturbance to move the isolated structure out of the way, but do not react to forces coming from the isolated structure. These actuators are in sharp contrast to a damping device with a dynamically variable damping coefficient as that device did not produce movement of the isolated structure. To improve the high frequency performance of this system and to reduce the band width requirements of its actuators, an elastomer isolator is employed in series with the actuators.

In the preferred embodiment of the present invention, a vibration isolator connects a first structural member to a second structural member. A linear hydraulic actuator has a cylinder with a piston moveable therein and an intermediate member is attached to the piston. A passive, elastomeric vibration isolator abuts the intermediate member. The elastomeric vibration isolator, the cylinder and the piston are coupled in series between the first and second structural members.

A spring extends between the first and second mounts for maintaining a spaced relationship therebetween. Preferably the spring is an air bag that is inflated to a pressure which removes the static load from the linear hydraulic actuator. For this purpose, it is preferred that the air bag surrounds the linear hydraulic actuator.

A sensor, such as an accelerometer, produces a signal which is indicative of movement of the first structural member due to vibrations and other disturbances in the second structural member. Ideally, the sensor is attached to the intermediate member so that the elastomeric vibration isolator shields the sensor from disturbances coming from the first structural member.

A valve selectively supplies a flow of pressurized fluid from an external source to the hydraulic actuator and selectively relieves pressurized fluid from the hydraulic actuator. The valve is operated by a control circuit which responds to the sensor signal. The fluid powers the hydraulic actuator producing movement of the first structural member which counteracts the sensed vibrational movement to maintain the first structural member stationary despite vibrations in the chassis. This effect produced by operation of the hydraulic actuator can be thought of as moving the first structural member out of the way of the vibrating chassis, rather than merely damping the chassis vibrations.

DETAILED DESCRIPTION OF THE PREFERRED EMBODIMENTS

Figure 2:
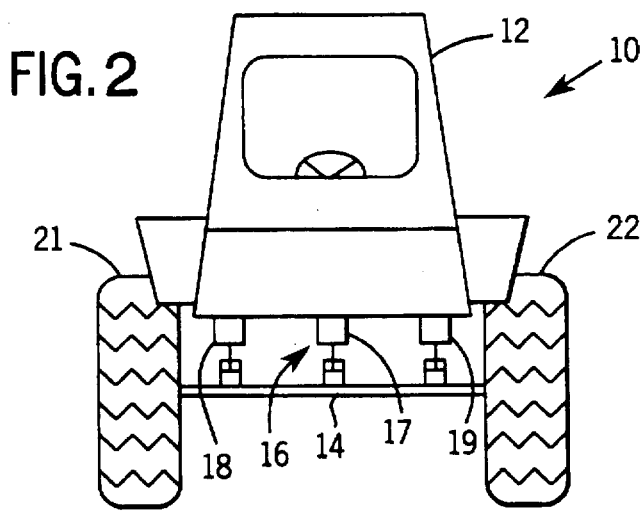
FIG. 2 is a schematic rear view of an agricultural tractor illustrating a cab suspension system according to the present invention which mounts an operator cab to the tractor chassis.
Figure 3:
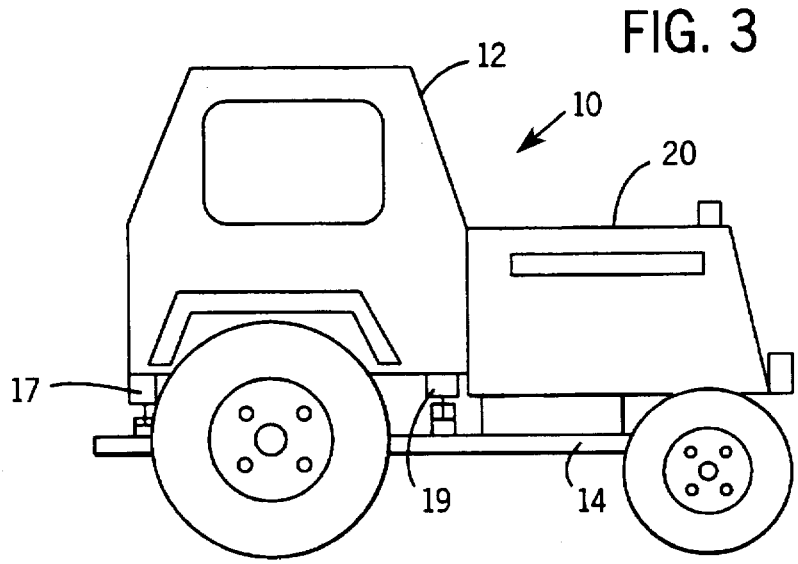
FIG. 3 is a side plan view of the tractor in FIG. 2.

With initial reference to FIGS. 2 and 3, an agricultural tractor 10 has a cab 12 in which the operator sits and which is mounted on a chassis 14 of the tractor. The tractor cab 12 is able to move independently on the chassis 14 from the engine housing 20 of the tractor 10. The cab 12 is mounted on the chassis 14 by a three point suspension system 16 which comprises three vibration isolators 17, 18 and 19. A single vibration isolator 17 is positioned at the rear of the cab centrally between the rear wheels 21 and 22. The remaining two vibration isolators 18 and 19 are positioned to each side of the cab at the front end thus providing a total of three supports for the cab. Alternatively the positioning could be reversed with two isolators in the rear and one at the front of the cab 12. This latter version would appear the same as shown in FIGS. 2 and 3 except the location of isolators 17 and 19 in FIG. 3 would be reversed. As will be described, suspension system 16 isolates the cab 12 from vibrations which occur in chassis 14 and engine housing 20.

Although the present invention is being described in the context of an agricultural tractor, the suspension system 16 has applications with other types of vehicles, such as tractors of trucks. In addition, the suspension system can be utilized to isolate vibrations between other types of components, such as between the vehicle cab and an operator's seat.

Figure 4:
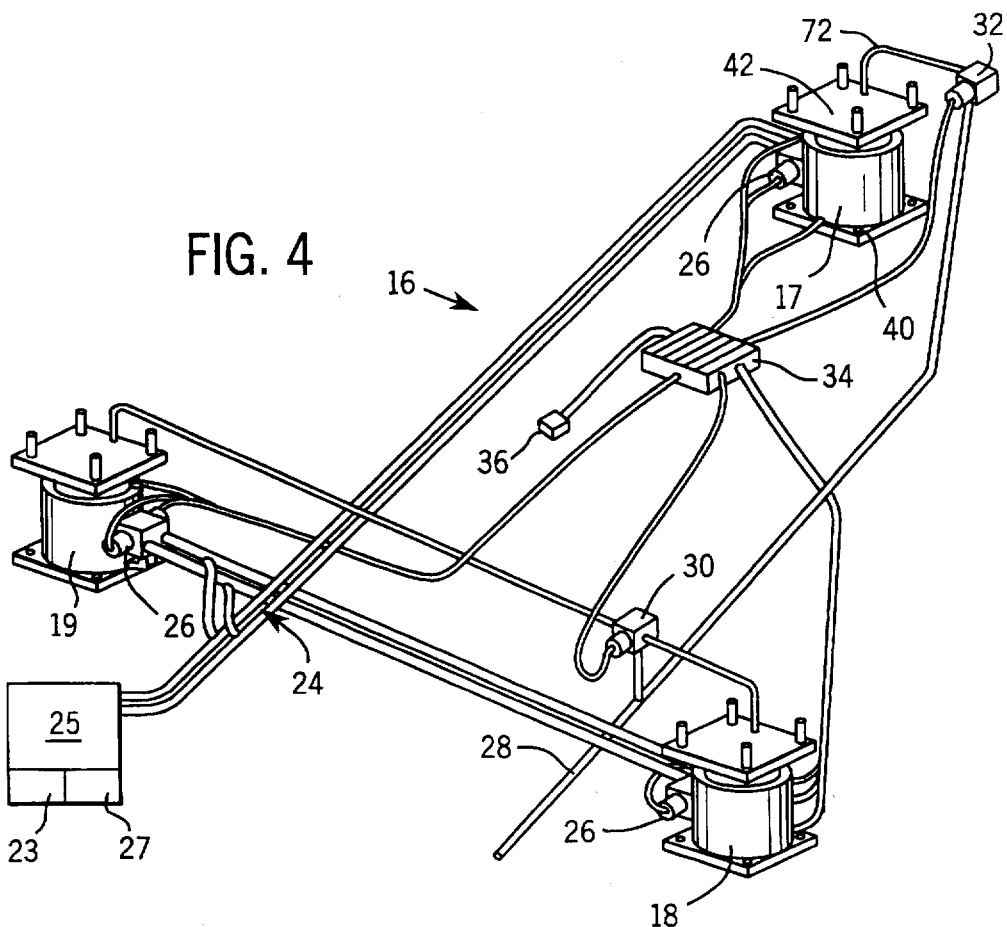
FIG. 4 is a perspective schematic view illustrating the cab suspension system of FIGS. 2 and 3.

Further details of the cab suspension system 16 are shown in FIG. 4. Each of the three vibration isolators 17, 18, and 19 is coupled to the supply and return lines 24 of the standard pressurized hydraulic system 25 for the tractor which includes a reservoir 23 and a pump 27. Those lines 24 are connected to three hydraulic valves 26, each of which is associated with a separate one of the three vibration isolators 17–19. In addition, a pressurized air supply line 28 of the tractor is connected to a first solenoid valve 30 which controls the supply of air to the front vibration isolators 18 and 19. The pressurized air supply line 28 also is connected to a second solenoid valve 32 which controls the flow of air to the rear vibration isolator 17. The hydraulic valves 26, pneumatic solenoid valves 30 and 32 are connected to a controller 34, which as will be described, operates those valves in response to input signals from sensors in the vibration isolators 17–19. The controller 34 is supplied with electrical power from the tractor 10 via connector 36.

Figure 5:
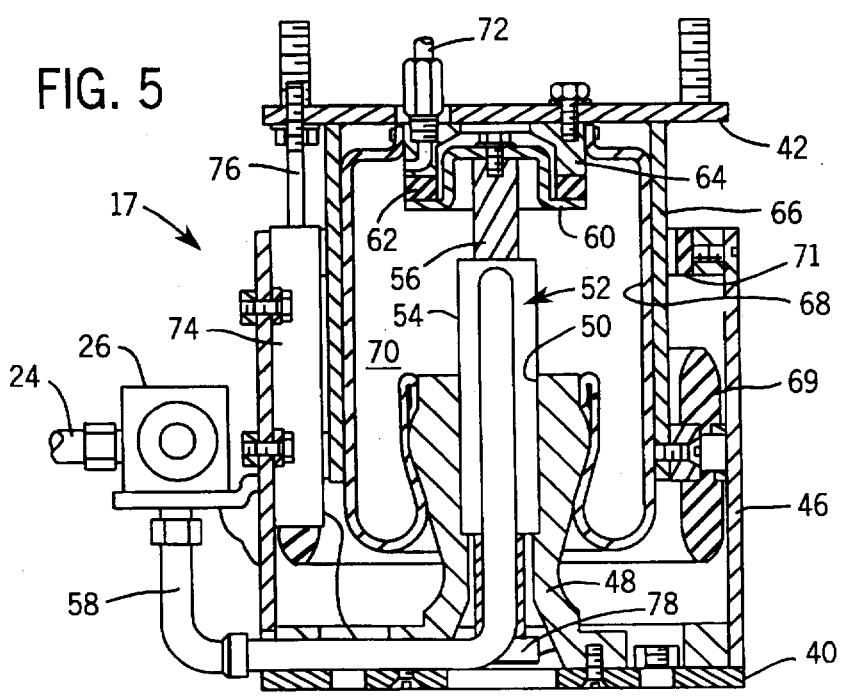
FIG. 5 is a cross-sectional view of one of the three vibration isolators shown in FIG. 4.

Each of the vibration isolators 17, 18, and 19 has an identical construction which is shown in detail in FIG. 5 in a cross-section representation of the rear vibration isolator 17. The vibration isolator 17 has a lower mount 40 for attachment to the chassis of the tractor 10. The vibration isolator 17 has an upper mount 42 for attachment to the tractor cab 12. A tubular outer casing 46 is attached, by welding for example, to the upper surface of the lower mount 40 and provides an enclosure for many of the components of the vibration isolator 17. An elongated, annular cylinder support 48 is bolted to the inner surface of the lower mount 40 centrally positioned within the outer casing 46. The upper end of the cylinder support 48 has a circular aperture 50 within which is received a linear hydraulic actuator 52 comprising cylinder 54 and piston 56. A shaft of the piston 56 extends through upper and lower ends of the cylinder. The cylinder 54 is coupled via two tubes 58 (only one shown) to the hydraulic valve 26 which is a four-way, three position electrically controlled solenoid valve that is operated by a pulse-width modulated signal from the controller 34.

The upper end of the piston 56 has an intermediate member 60 bolted thereto. An annular elastomer isolator 62, formed of a resilient material, is bonded between the intermediate member 60 and an annular support 64. The damped elastomer isolator 62 enhances high frequency attenuation between the support 64 and intermediate member 60. The support 64 is bolted to upper mount 42 which is attached to the underside of the tractor cab 12.

A cylindrical tubular inner casing 66 is welded to the underside of the upper mount 42 coaxial with the axis of the linear hydraulic actuator 52 and surrounding the support 64.

An air bag 68 of resilient material is sealed in an air tight manner to the surface of support 64 attached to upper mount 42 and to the surface of cylinder support 48 which is attached to the lower mount 40. Alternatively, the air bag could be attached to the intermediate member 60 instead of the upper mount 42. The air bag 68 forms an interior cavity 70 that is variable in volume to which compressed air is supplied via tubing 72 which is connected to the solenoid valve 32, shown in FIG. 4. As will be described, the solenoid valve 32 controls the flow of air into and out of the cavity 70 formed by air bag 68. The air bag is confined laterally by the inner casing 66.

An inductive displacement sensor 74 is fixedly attached to the interior surface of the outer casing 46 and has an actuator shaft 76 projecting therefrom which is attached to the upper mount 42. The inductive displacement sensor 74 produces an electrical signal which indicates the distance $\delta$ between the upper and lower mounts 40 and 42. An accelerometer 78 is attached to the lower end of the piston 56 and produces an electrical signal indicative of movement of the intermediate member 60 in a direction along the axis of the piston. Alternatively, the accelerometer 78, or a similar type of motion sensor, could be attached directly to the intermediate member 60. The displacement sensor 74 and accelerometer 78 are connected electrically to the controller 34.

Figure 1:
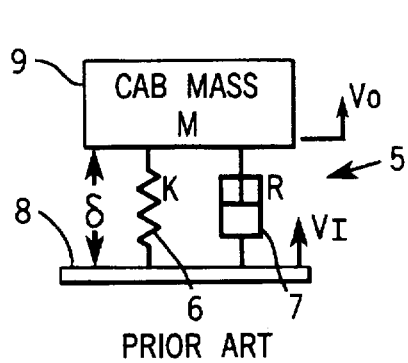
FIG. 1 is a schematic representation of a prior art vibration isolator that incorporates a spring and a damper.
Figure 6:
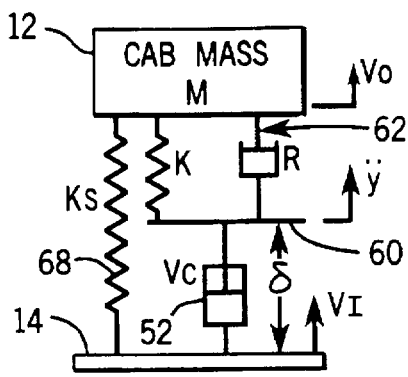
FIG. 6 is a schematic representation of the functional components of one of the vibration isolators.

The vibration isolator 17 provides a suspension mount which is hard relative to external forces acting on the cab, while also being soft with respect to disturbances transferred from the chassis into the cab. For low frequencies, this hard/soft suspension mount is modeled schematically in FIG. 6 in which the chassis 14 is connected to the intermediate member 60 by the hydraulic actuator 52 and a spring formed by the air bag 68 connects the chassis directly to the cab 12. The hydraulic actuator provides low frequency isolation between elements 14 and 60 and thus between the chassis 14 and the cab 12 of the tractor. The intermediate member 60 in turn is coupled to the tractor cab 12 by the elastomeric isolator 62 which serves as a hard isolator attenuating high frequency vibrations between the chassis and the cab. The characteristics of the suspension system are defined by the mass M that is supported by each vibration isolator 17–19, the stiffness K of the elastomeric isolator 62, the damping coefficient R of elastomeric isolator 62, stiffness Ks of the air bag spring which does not affect idealized isolation only the power consumption of the hydraulic isolator, and the input velocity Vc of the hydraulic actuator that is being controlled actively. The low frequency acceleration $\ddot{y}$ transmitted to intermediate member 60 is given by the expression: $\ddot{y}=Vc+\delta$.

The air pressure to the air bags 68 can be controlled by either of two mechanisms. The simplest of these utilizes pressure regulators at the two valves 30 and 32 which maintain a fixed output air pressure that supplies the respective vibration isolator 17–19. The air pressure level at which each regulator is set is determined by the static load of the cab on the associated vibration isolator. For example, if the cab and tractor operator have a combined nominal weight of 3,000 pounds that is evenly distributed between the three vibration isolators 17–19 with each one supporting a 1000 pound static load. This static load on each vibration isolator determines the pressure to which its air bag must be inflated.

Although such a fixed regulated air pressure technique may function adequately for constant load distributions, practical performance can be achieved by dynamically adjusting the air bag pressure to compensate for changes in the cab load. For example, the weight of operators varies significantly or a heavy object, such as a bag of seed, may be placed in the cab. A dynamically adjusting system incorporates a load sensor at each vibration isolator 17–19 and the air pressure to a given vibration isolator is varied by the controller 34 to compensate for the actual load measured at that support position.

The air bag 68 forms a spring which off-loads the static weight of the cab from the hydraulic actuator 52 thereby reducing the size of the cylinder 54 and the power that would be consumed otherwise without such off-loading. This off-loading function is enhanced by the coaxial relationship of the linear hydraulic actuator 52 and the resiliency provided by the air bag spring 68 that extends around the cylinder 54, as shown in FIG. 5.

An annular resilient snubber 69 is fastened around the lower portion of the inner casing 66. This snubber 69 acts as a bumper preventing the bottom of the air bag 68 from striking the interior of the lower mount 40 during extreme vibrations. In addition, since the elastomeric isolator 62 is placed loosely on the intermediate member 60, the snubber 69 also restricts the horizontal movement between the inner and outer casings 66 and 46, respectively. A resilient annular guide 71 near the top of the outer casing 46 also acts as a bumper which restricts horizontal movement between the casings.

The elastomeric material provides a passive isolator 62 which attenuates higher frequencies (above about seven hertz) from the chassis 14. The active vibration isolation of lower frequencies (one to seven hertz) is accomplished by the controller 34 responding to the sensed acceleration and displacement at each support position and altering the hydraulic pressure within the corresponding cylinder 54 to maintain the cab 12 essentially stationary. The passive and active isolators in series between the upper and lower mounts 40 and 42 effectively isolate the cab 12 from vibrations in the tractor chassis 14.

Figure 7:
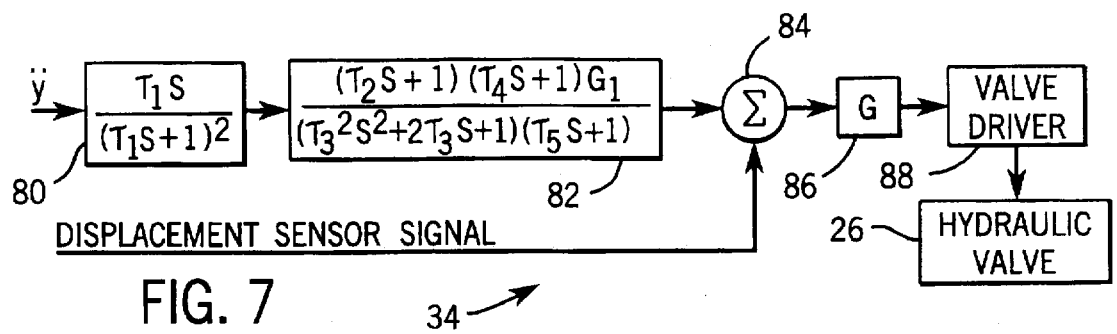
FIG. 7 is a flow chart of the control process for each vibration isolator.

The active vibration isolation is affected by the controller 34 which either may be a microcomputer based servo amplifier system or a hardwired implementation. A block diagram of an exemplary servo amplifier system, which is replicated in controller 34 for each vibration isolator 17–19, is shown in FIG. 7. The accelerometer 78 detects the motion of the intermediate member 60 and thus is isolated by the elastomeric isolator 62 from high frequencies coming from the cab. The signal $\ddot{y}$ from accelerometer 78 is fed into a first network 80 having the indicated transfer characteristic. The function of the first network 80 is to remove DC components from the acceleration signal $\ddot{y}$ and thus remove the portion of the signal due to the constant acceleration of gravity. The first network also integrates the resultant signal to produce an output signal indicative of absolute velocity of intermediate member 60.

The absolute velocity signal from the first network 80 is applied to a second filter network 82 which provides the dynamics to give isolation at the lower vibration frequencies, i.e. one to ten hertz. This second network 82 provides the desired stability and performance characteristics of the active isolator embodied by the linear hydraulic actuator 52. For example, if the dominant vibration frequency in the chassis 14 is three hertz, the second network 82 is tuned to that frequency so that the hydraulic actuator will be operated to provide optimum response to three hertz vibrations. The second network 82 thus provides a transfer characteristic as indicated to enable a stable closed loop control system. Other network transfer characteristics may also be used, see for example in D'azzo and Houpas, *Feedback Control System Analysis and Synthesis*.

The output of the second network 82 is summed at node 84 with the signal from the displacement sensor 74. Thus, the summation produces a signal which not only indicates the velocity of the cab which must be counteracted, but also an error in the displacement of the piston 56 of the vibration isolator 17–19 from its center position. Without sensing the displacement of the two mounts 40 and 42 of the vibration isolator 17–19, the piston over time can migrate to one of its extreme positions and thus be unable to properly counteract vibrations being transmitted from the chassis 14 to the cab 12 through the support. Thus, by summing the displacement signal with the signal derived from the accelerometer, the piston will be returned to a center position of its travel during static conditions.

The summed signals are fed through an adjustable gain circuit 86 before being applied to the input of a standard valve driver 88. The valve driver 88 produces conventional pulse-width modulated signals for operating the hydraulic valve 26 associated with the particular vibration isolator 17–19. The valve driver output signal operates the valve 26 to supply fluid power from a pump on the tractor to the hydraulic cylinder 54. This action drives the hydraulic actuator 52 with pressurized fluid from the tractor hydraulic system 25 causing the piston 56 to move in a manner that prevents chassis vibrations from being transmitted to the cab 12. The transmissibility of each vibration isolator 17, 18 and 19 is given by the expression:

$$\frac{V_0}{V_I} = \frac{1}{1+G} \cdot \frac{\frac{R}{M}S + \frac{K}{M}}{S^2 + \frac{R}{M}S + \frac{K}{M}}$$

where G is the gain of the accelerometer branch (e.g. G=100) which relates Vc to ẏ (velocity of the intermediate member 60). Note that the stiffness Ks of the air bag spring does not affect the transmissibility, but merely off-loads the static weight of the cab from the isolators so that the power consumption of the hydraulic isolator can be reduced.

With the present isolator system the hydraulic actuator 52 actually moves the cab 12 with respect to the chassis 14 so that the universal position of the cab remains relatively stationary along the axis of the hydraulic actuator. This vibration isolation counteracts the bounce, pitch, and roll of the cab.

Figure 8:
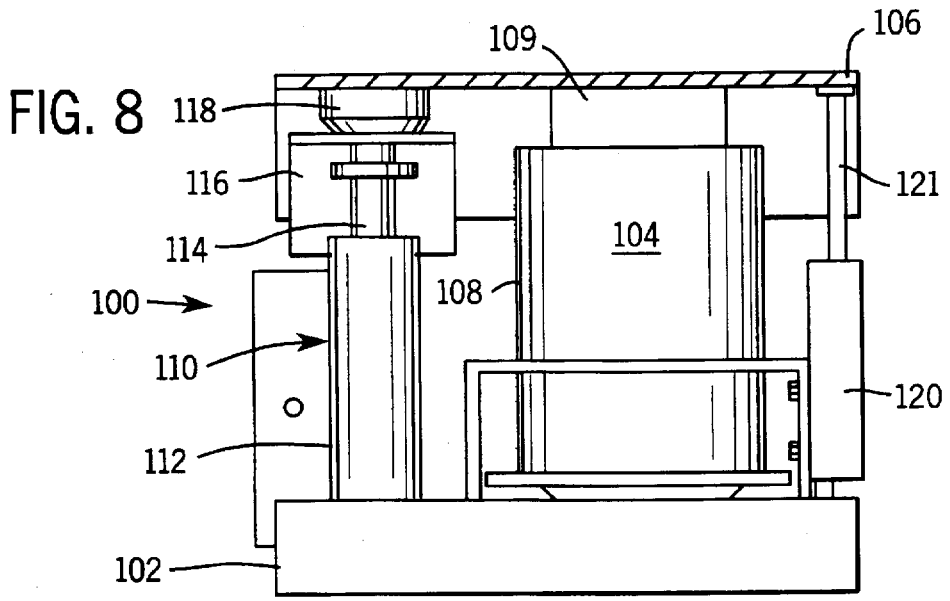
FIG. 8 is a front plan view of an alternative embodiment of a vibration isolator according to the invention.

Although the coaxial configuration of the vibration isolator 17–19 depicted in FIG. 5 is preferred, alternative component arrangements also are within the scope of the present invention. For example, FIG. 8 shows a vibration isolator 100 with separately mounted elements. Specifically, an air bag enclosure 104 is attached between the lower and top mounts 102 and 106, respectively. This air bag enclosure 104 has an outer casing 108 similar to casing 46 in FIG. 5. The outer casing 108 is attached on the lower mount 102. A tubular inner casing 109 is welded to the upper mount 106 and extends downward into the outer casing 108. An air bag (not visible), which is similar to air bag 68, is connected between the two casings 108 and 109 and can be inflated with air pressure to off-load the weight of the cab 12 from the remaining components of the vibration isolator 100. Instead of being within the air bag enclosure 104, the linear hydraulic actuator 110 is adjacent thereto. The actuator 110 comprises a hydraulic cylinder 112 attached to the lower mount 102 and a piston 114, that engages the underside of an intermediate bracket 116 to which an accelerometer (not shown) is attached. The accelerometer senses motion in a direction parallel to the axis of the piston 114. A passive isolator 118 of resilient material is placed between the intermediate member 116 and the upper mount 106.

An inductive displacement sensor 120 is attached to a bracket connected to the lower mount 102, and has an actuator shaft 121 connected to the upper mount 106.

The second embodiment of a vibration isolator 100 according to the present invention functions in the same manner described previously with respect to the coaxial embodiment shown in FIG. 5. Specifically, the signals from an accelerometer connected to the intermediate member 116 and the signal from the displacement sensor 120 are applied to a controller 34 which operates on the signals according to the function specified in FIG. 7 to control a hydraulic valve which supplies fluid power to cylinder 112.

Figure 9:
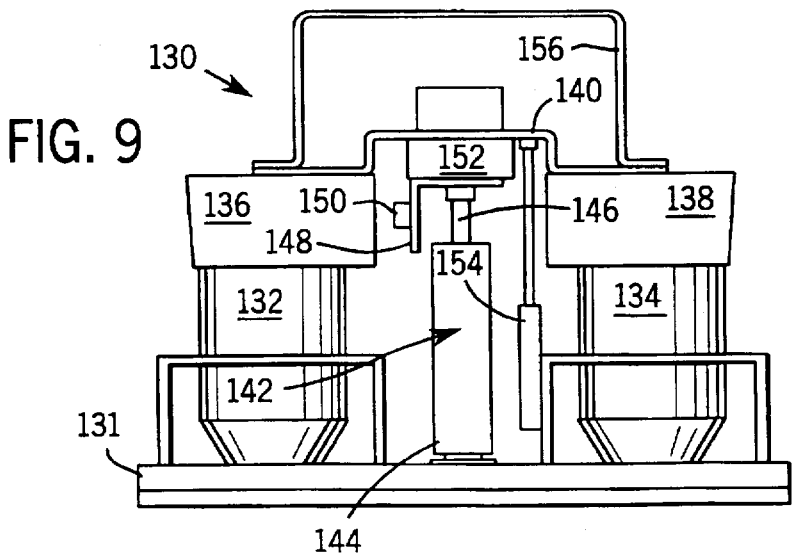
FIG. 9 is a front plan view of another alternative embodiment of a vibration isolator according to the invention.

As noted previously, the three support system for tractor cab 12 has a single vibration isolator 17 at the rear of the cab (although the single unit may be at the front of the cab). In some instances, the weight of the cab at the rear position will be too great for a single air bag spring to off-load from the linear hydraulic actuator. In such a case, a support having dual air bag springs may be used as shown in FIG. 9. This vibration isolator 130 has a pair of air bag assemblies 132 and 134 similar to the air bag structure described with respect to FIG. 8. The tubular inner casing of each of these air bag assemblies 132 and 134 is attached to a separate mounting bracket 136 and 138, respectively, which are joined together by a coupling bracket 140. An upper mount 156 is provided to attach the coupling member 140 to the cab 12 of the tractor 10.

A linear hydraulic actuator 142 comprising a cylinder 144 and a piston 146 is located horizontally between the two air bag assemblies 132 and 134 with the cylinder attached to the lower mount 131. The piston 146 engages an intermediate member 148 to which is attached an accelerometer 150 which detects motion in a direction parallel to the axis of the piston 146. A passive isolator 152 of resilient material is placed between the intermediate member 148 and the coupling bracket 140. The two air bag assemblies 132 and 134 act as springs which off-load the static weight of the cab 12 from the hydraulic actuator 142 enabling that latter device to be reduced in size and consume less power than if the weight was not off-loaded.

An inductive displacement sensor 154 is attached to a bracket connected to the lower mount 131 and has an actuator shaft attached to the coupling bracket 140. The displacement sensor 154 produces an electrical signal indicative of the position of the coupling bracket 140 with respect to the lower mount 131.

The foregoing description is directed primarily to the embodiment where the suspension system supports a vehicle cab on a chassis. However, the vibration isolators can be utilized to isolate vibrations between other types of components, such as between the vehicle body and an operator's seat. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

We claim:

1. An active suspension system for isolating an operator cab from a frame of a tractor, said active suspension system comprising:

at least one vibration isolator including first and second mounts adapted to attach said vibration isolator between the operator cab and the frame, a spring connected between the first and second mounts, a linear actuator connected to the first mount, and an elastomeric vibration isolator connected between said linear actuator and the second mount which is attached to the operator cab;

a sensor which detects movement of the operator cab said sensor being located adjacent to said linear actuator to detect movement at a point that is between said linear actuator and said elastomeric vibration isolator and producing an electrical signal in response to detected movement; and a controller operably connected to the linear actuator and responsive to the electrical signal by producing a control signal which selectively causes the linear actuator to expand and contract between the first and second mounts thereby changing the spacing therebetween, so as to attenuate transmission of movement of the operator cab and the frame.

2. The active suspension system as recited in claim 1, wherein said system includes three of said vibration isolators.

3. The active suspension system as recited in claim 2, wherein two of said vibration isolators are located at a forward position of the operator cab and one of said isolators is located at a rearward position of the operator cab.

4. The active suspension system as recited in claim 2, wherein two of said vibration isolators are located at a rearward position of the operator cab and one of said isolators is located at a forward position of the operator cab.

5. The active suspension system as recited in claim 1, wherein said spring is an air spring.

6. The active suspension system as recited in claim 5, wherein said air spring is variable in volume; and further comprising an air valve which supplies a flow of pressurized air to maintain a predefined air pressure within said air spring.

7. The active suspension system as recited in claim 5, wherein said air spring is variable in volume; and further comprising an air valve supplying and relieving a flow of pressurized air to and from said air spring, respectively, to maintain a predefined air pressure within said air spring.

8. The active suspension system as recited in claim 7 wherein said controller determines the predefined air pressure in response to load force exerted on said vibration isolator and operates said air valve to maintain that predefined air pressure.

9. An active suspension system for isolating an operator cab from a frame of a tractor, said active suspension system comprising:

at least one vibration isolator including first and second mounts adapted to attach said vibration isolator between the operator cab and the frame, a hydraulic actuator having a piston moveable with respect to a cylinder, and a passive isolator connected in series with the hydraulic actuator between the first and second mounts;

a valve operable to selectively supply a flow of pressurized hydraulic fluid from an external source to said actuator and to selectively relieve pressurized hydraulic fluid from said actuator so as to cause the piston to move in a given direction relative to the cylinder;

a sensor mechanism which produces a signal indicative of the absolute velocity of a point between the hydraulic actuator and the passive isolator; and a controller which responds to the signal from said sensor by producing a valve control signal for operating said valve to produce movement of the piston relative to the cylinder, so as to attenuate transmission of movement of the operator cab with respect to the frame.

10. The active suspension system as recited in claim 9, further comprising a spring connected to said frame and connected to one of the operator cab and the point between the hydraulic actuator and the passive isolator.

11. The active suspension system as recited in claim 10, wherein said spring is an air spring.

12. The active suspension system as recited in claim 11, wherein said air spring is variable in volume; and further comprising a valve through which pressurized air is supplied to maintain a predefined air pressure within said air spring.

13. The active suspension system as recited in claim 9 wherein the passive isolator comprises elastomeric material.

* * * * *